No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 1.

Witnesses:
Eugene R. Weber
Jules C. Hertzog

Inventors,
John J. Brownrigg
John K. Norstrom
By Glenn D. Noble
Att'y.

No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 2.

No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 3.

Witnesses.
R. A. Johnson.
James Waters

Inventors
John J. Brownrigg.
and John K. Norstrom.
By Brown & Darby Att'ys

No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 4.

No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 5.

Witnesses:
Eugene R. Weber.
Jules C. Hertzog.

Inventors,
John J. Brownrigg.
John K. Norstrom
By Glenn S. Noble
Att'y.

No. 752,251. PATENTED FEB. 16, 1904.
J. K. NORSTROM & J. J. BROWNRIGG.
AUTOMATIC TELEPHONE SYSTEM.
APPLICATION FILED JUNE 28, 1901.
NO MODEL. 6 SHEETS—SHEET 6.

Witnesses:
Eugene R. Weber
Jules C. Hertzog

Inventors,
John J. Brownrigg
John K. Norstrom
By Glenn D. Noble Att'y.

No. 752,251.   Patented February 16, 1904.

UNITED STATES PATENT OFFICE.

JOHN K. NORSTROM AND JOHN J. BROWNRIGG, OF CHICAGO, ILLINOIS, ASSIGNORS, BY DIRECT AND MESNE ASSIGNMENTS, TO THE GLOBE AUTOMATIC TELEPHONE COMPANY, OF CHICAGO, ILLINOIS, A CORPORATION OF ILLINOIS.

AUTOMATIC TELEPHONE SYSTEM.

SPECIFICATION forming part of Letters Patent No. 752,251, dated February 16, 1904.

Application filed June 28, 1901. Serial No. 66,356. (No model.)

*To all whom it may concern:*

Be it known that we, JOHN K. NORSTROM and JOHN J. BROWNRIGG, citizens of the United States, and residents of Chicago, in the county of Cook and State of Illinois, have invented certain new and useful Improvements in Automatic Telephone Systems, of which the following is a specification.

This invention relates to that class of telephone systems known as "automatic" or those in which one subscriber to the system may communicate directly with another without the necessity of calling up a central operator and comprises the necessary signaling devices, switches, connections, &c., to form a complete system. Its objects are to provide a system of the nature stated that will be exceedingly simple and economical in construction and efficient and durable in operation. These objects are accomplished by means of the devices which will be fully explained hereinafter and are shown in the accompanying drawings, in which—

For convenience in description the separate devices will be described in detail and then the method of connecting to make a complete system shown.

Figure 1:
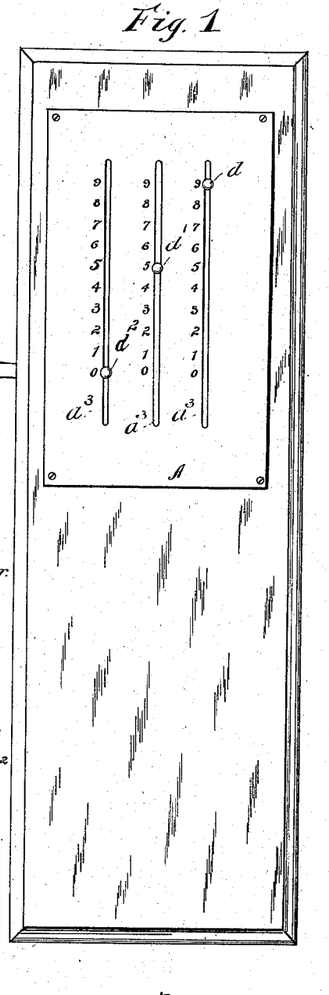
Figure 1 is a front elevation of the signaling device with the receiver removed.
Figures 2, 3:
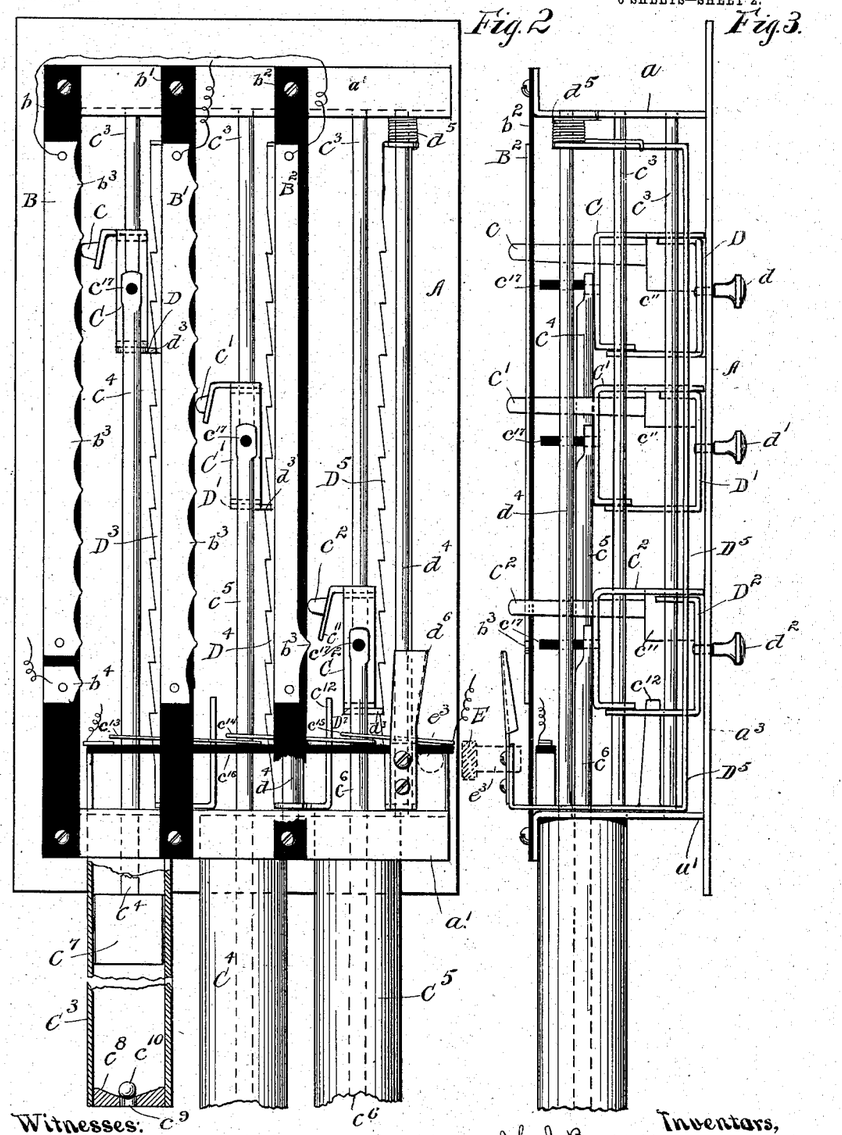
Fig. 2 is a rear elevation of the mechanism of the signaling device.
Fig. 3 is a side elevation of the same. Fig. $3^a$ is a horizontal sectional view of the same.
Figure 3A:
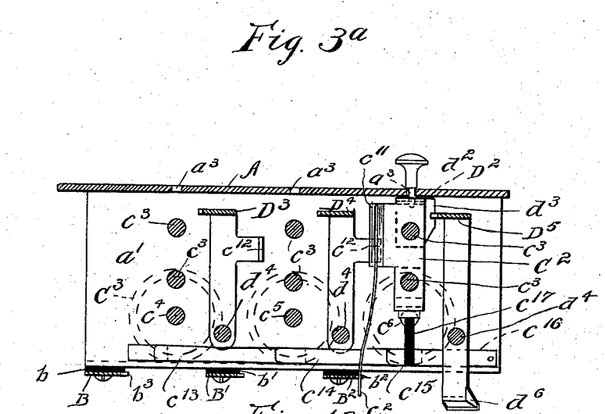

In the signaling device, A represents a front plate forming a portion of the frame for the mechanism. Secured to brackets $a\ a'$ on the plate A are insulating-strips $b\ b'\ b^2$, carrying electrical contact-strips B B' B². The strips B B' are shown in Fig. 2 as having a plurality of points $b^3$ projecting beyond the edges of the insulating-strip, while the right-hand member B² is shown in this figure of the drawings as provided with only one of said points; but it is adapted to be used with any convenient number. At the bottom of the left-hand member B is a separate point $b^4$, insulated from the strip B.

Wiping-contacts $c\ c'\ c^2$ are secured to brackets C C' C², sliding on rods $c^3\ c^3$, secured in the frame-brackets $a\ a'$. The sliding brackets are attached to piston-rods $c^4\ c^5\ c^6$, which extend down through the bracket $a'$ and carry piston-weights $c^7$, sliding freely in cylinders C³ C⁴ C⁵. These cylinders are closed at the bottom by heads $c^8$, which are slightly hollowed out on the upper surfaces and have small apertures $c^9$ through the centers which, in connection with balls $c^{10}$, form valves to admit the air readily, but prevent its being forced out when the piston descends. The brackets C C' C² are raised to any desired position by supplemental sliding brackets D D' D², which engage the lower surfaces of the arms thereof and are provided with lifting buttons or handles $d\ d'\ d^2$, which extend out through slots $a^3$ in the plate A. Projections $d^3$ on the lower arms of the brackets D D' D² are adapted to engage with toothed bars D³ D⁴ D⁵, by which they are supported at any desired point. These bars are bent at the ends and pivoted on rods $d^4$, secured in the frame. Springs $d^5$ hold the toothed bars into engagement with the sliding brackets. The bars are divided into a number of teeth corresponding with the number of contact-points on the strips B B' B², as shown, in this instance ten, and the face of the plate A is correspondingly numbered, as shown in Fig. 1. The teeth are so arranged, however, that the wiping-contacts will not stop on any of the contact-points when the sliding bracket is resting on a tooth of the bar.

An extension of the bottom arm of the bent toothed bar $D^5$ is provided with a spring-cam or beveled member $d^6$, which is adapted to engage with an insulated lug $e^3$ on the receiver-hook E of the telephone and by means of which the bar $D^5$ is thrown out of engagement with the sliding bracket $D^2$, allowing it to fall. The support thus being taken away from the bracket $C^2$ it gradually descends, being retarded by its piston in the cylinder. When it has arrived at the bottom, a beveled arm $c^{11}$, to which the wiper $c^2$ is for convenience attached, engages an arm $c^{12}$ on the toothed bar $d^4$, thereby drawing it out of engagement with its sliding bracket and in turn as these brackets descend they release the last member in a similar manner, and its wiper $c$ makes the various contacts with the points on the strip B.

Three circuit-closures $c^{13}$ $c^{14}$ $c^{15}$ are arranged on an insulation-strip $c^{16}$, supported on the bracket $a'$ at the rear of the rods $d^4$. These closures are adapted to be engaged by insulation-pins $c^{17}$ on the sliding brackets C C' $C^2$ and are closed thereby when the brackets are at their lowest position.

The operation is as follows: The subscriber raises the buttons to points opposite the numerals denoting the number he wishes to communicate with and takes down the receiver. This allows the hook to rise, which releases the first sliding bracket. It falls, closes the closure $c^{15}$, and in turn releases the next bracket, which falls, closes closure $c^{14}$, and in turn releases the last bracket, which falls, closes closure $c^{13}$, the wipers having in their descent made a number of contacts corresponding to the numerals. Other methods may be used to make the contacts between the falling bracket and the contact-points, which may also be arranged in various ways, the essential feature being to make and break a circuit any desired number of times.

Figure 4:
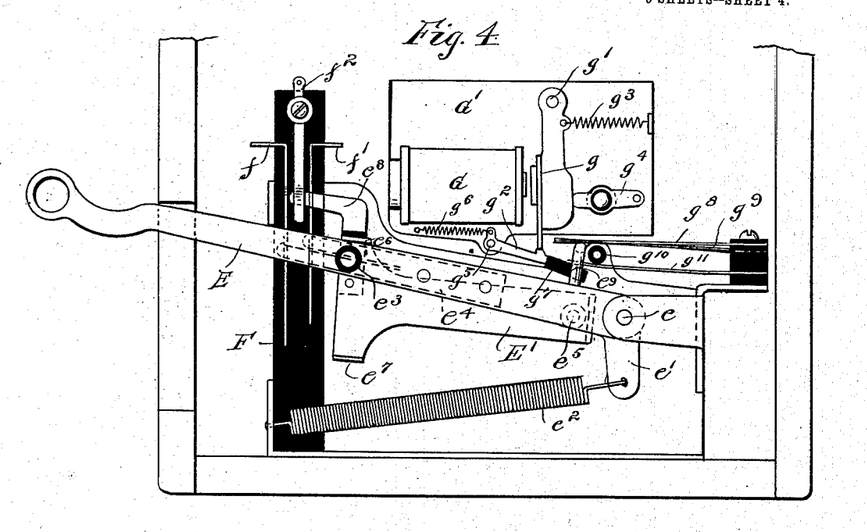
Fig. 4 is a view of the receiver-hook, showing the switch-operating mechanism and private cut-out device.
Figure 5:
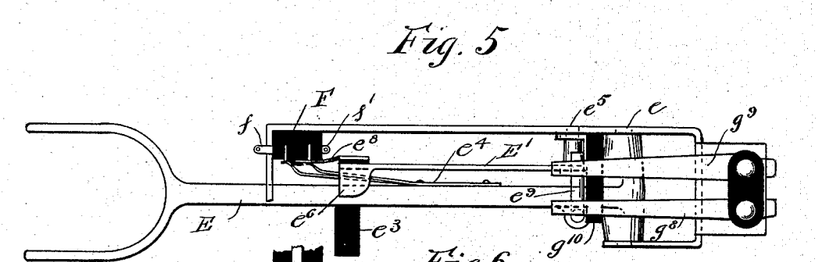
Fig. 5 is a plan view of a portion of the same.
Figure 6:
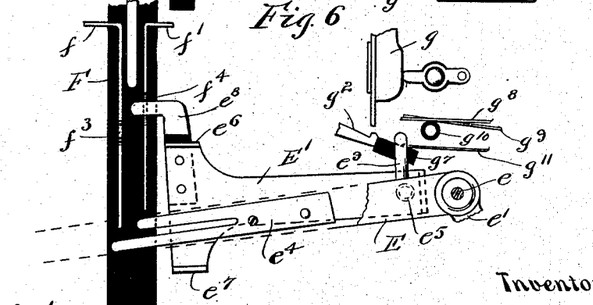
Fig. 6 is a fragmental view showing the hook in its position when the receiver is hung up.

E, Fig. 4, represents the receiver-hook of a telephone, which is pivoted at $e$ and has a short arm $e'$ extending downward, to which is attached a tension-spring $e^2$, by means of which the hook is held in a raised position when the receiver is removed. A lug or insulated pin $e^3$ on the front of the hook-arm is adapted to engage the beveled member $d^6$ of the signaling device, as before mentioned. Behind the hook at a convenient distance from the pivot is a bar of insulation material F, in which are secured two contact-strips $f$ $f'$, while a third contact $f^2$ is attached at the top and extends for a distance down between these two. A double-ended wiper $e^4$ is secured to the back of the hook-arm E and makes a contact between the strips $f$ and $f'$ while the hook is moving up or down; but the points pass below the strips at the bottom limit, and at the upper limit the strips are recessed, as at $f^3$ $f^4$, so that the wipers rests upon the insulation. An arm E', pivoted to the frame-plate at $e^5$ and extending in the same direction as the hook-arm, is provided with two outturned lugs $e^6$ $e^7$, which are adapted to engage the hook-arm at the upward and downward limits of its movement. An insulated wiper $e^8$ is secured to the arm E' and extends forward sufficiently over the strip $f'$ to engage with the contact $f^2$. When the hook is raised, the wiper $e^8$ makes a connection between the contact $f^2$ and the strip $f'$; but when the hook is pressed down just before it reaches the limit of its throw it strikes the lug $e^7$ and throws the arm E' down, thereby disengaging the wiper $e^8$ and carrying it down over the recessed portion $f^4$ of the strip $f'$ and out of electrical contact. Above the hook is located a magnet-coil G, the armature $g$ of which is pivoted at $g'$ and extends downward to engage a catch $g^2$. A spring $g^3$ holds the armature normally away from the coil and in contact with an insulated connection $g^4$. The catch $g^2$ is pivoted at $g^5$ and held by a spring $g^6$ in contact with the end of the armature. An insulated extension $g^7$ on the catch engages a bent arm $e^9$ on the receiver-hook and is pressed down when the hook is depressed, thereby disengaging the armature $g$ from said catch. The arm $e^9$ also engages two contact-springs $g^8$ and $g^9$ when the hook is raised; but as it is pressed down these springs rest upon an insulated bar $g^{10}$ and the arm passes on to press down a contact-spring $g^{11}$. The magnet G and its operative mechanism are arranged on a plate G', which is not in electric contact with the frame supporting the hook and its mechanism. The switch, Figs. 7, 8, 9, 10, 11, is essentially a device whereby a wiper-contact finger may be brought into contact with any desired terminal or connection of a number of wires as arranged on a suitable insulating-plate.

$h$ is a frame-plate in which an insulating-plate $h$, carrying the wire-terminals and contact-points $h'$, is mounted.

The wiper I is mounted on a horizontally-movable carriage, the supporting guide-rods for which are in turn carried by a vertically-movable carriage. Rods $h^2$ $h^2$, carried by the frame-plate H, furnish guides for the vertically-movable carriage J. A depending toothed bar $j$, secured to the carriage, also supports and guides the same by passing through keepers $h^3$ $h^4$ on the plate H. The vertical movement is accomplished by means of an electromagnet K, Figs. 9 and 10, the armature $k^{13}$ of which is pivoted at $k$ to a bracket from the plate H and is continued along said bracket to form an arm $k'$, which carries a ratchet-pawl $k^2$, which is thrown into engagement with the teeth of the bar $j$ (when the arm is swung upward by the action of the magnet) by a spring $k^3$, secured to a projecting lug $k^4$ on the pawl and to the arm $k'$. The arm $k'$ is pressed back to normal position by a spring $k^5$, and as it is thrown back a projecting finger $k^6$ on the ratchet-pawl strikes the keeper $h^4$ and throws the pawl out of engagement with the bar $j$. When the arm swings upward and the pawl engages with a notch to raise the carriage upward, it engages with a beveled portion $h^5$ of the keeper $h^3$, which forms a positive stop to prevent the carriage from being lifted more than one notch at a time.

The detent $k^7$ is pivoted on a rod $k^8$, supported by the frame-plate H, and is bent to extend back through a slot in the plate to engage a catch $l'$, pivoted to the arm $l$ of an armature of a magnet L. The arm $l$ is pivoted at $l^2$. A spring $l^3$, attached to the plate H and a short arm of the pivoted catch $l'$, holds the catch ready to engage the bent arm of the detent-pawl $k^7$ and holds the armature arm $l$ from the magnet. A spring $k^9$, attached to the plate H and the bent arm of the detent $k^7$, presses the pawl into engagement with the notched bar $j$. A bent arm $j'$ extends from the carriage J back through a slot $h^6$ in the plate and strikes the catch $l'$ when the carriage is in its lowest position, thereby releasing the pawl if it is engaged by a catch and holding the catch out of engagement. If an intermittent current be sent through the magnet K, the armature will be repeatedly attracted and through the medium of arm $k'$ and pawl $k^2$ will raise the carriage as many notches as there are pulsations, the detent having been in operative engagement. Then if a current be sent through the magnet L its armature, with the connecting lever and catch, will be drawn forward and the catch will engage the bent arm of the detent $k^7$. The spring $l^3$ being stronger than the spring $k^9$ of the detent $k^7$ draws the detent out of engagement and allows the carriage to drop the arm $j$ thereon again disengaging the catch, as above explained. An extended insulated arm $k^{10}$ on the armature $k^{13}$ makes contact between two contact-springs $k^{11}$ $k^{12}$ at each movement of the armature. The lower end of the bar $j$ makes a contact with a contact-spring $J^5$ when the carriage is in its lowest position. It will be noted that an upward movement of one notch does not bring the contact-point of the wiper I in line with the bottom row of contact-points $h'$, it requiring a movement of two notches for this purpose; but a movement of one notch brings the carriage into contact with a finger $J'$.

Figures 7, 8:
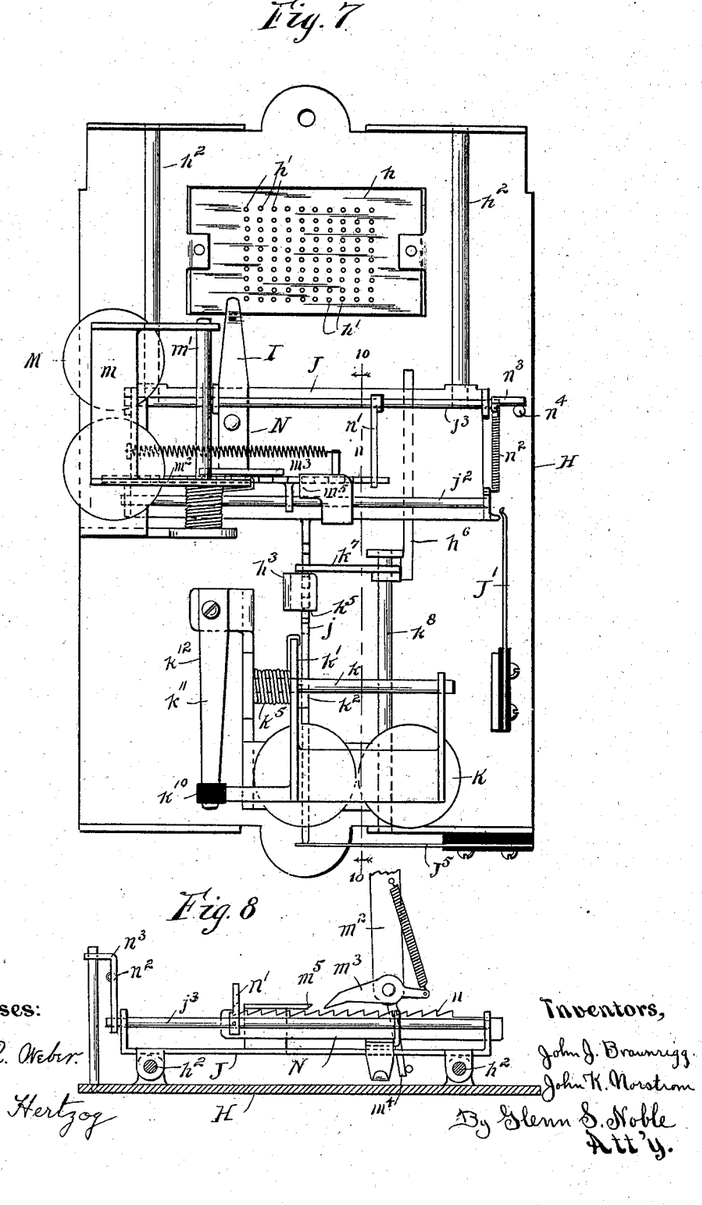
Fig. 7 is a front elevation of the automatic switch.
Fig. 8 is a top plan view of same, partly in section.
Figure 9:
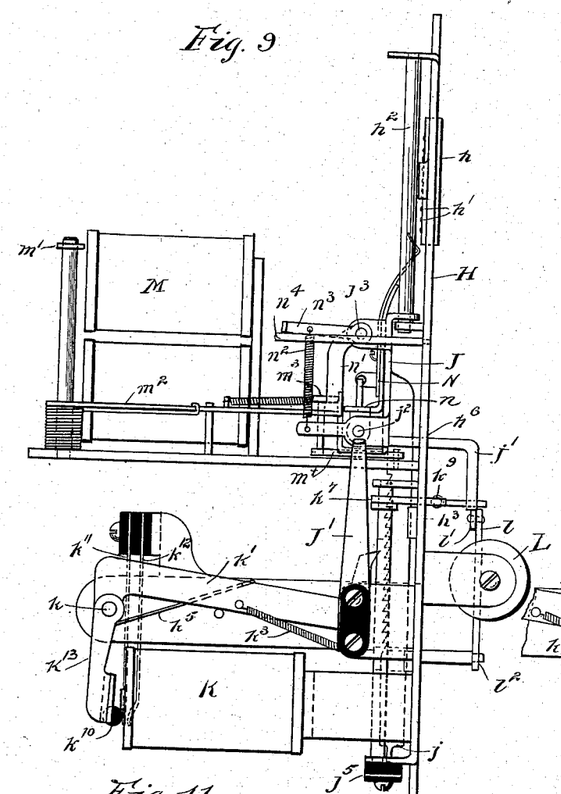
Fig. 9 is a side elevation of same.
Figure 10:
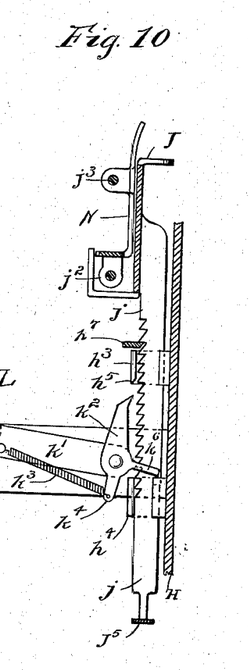
Fig. 10 is a sectional view on line 10 10 of Fig. 7.
Figure 11:
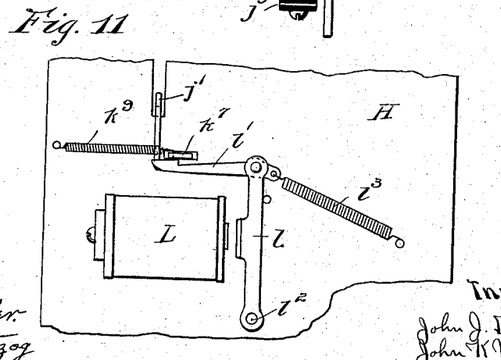
Fig. 11 is a fragment of the rear elevation.

The side or horizontal movement of the wiper I is accomplished by an electromagnet M, secured to the plate H, having an armature $m$ pivoted at $m'$ to a bracket from the plate H and having a lateral arm $m^2$, Fig. 8, with a ratchet-pawl $m^3$, provided with a tang $m^4$ for holding it out of engagement, and a beveled stop $m^5$ serves to limit the throw of the pawl similar to the device above described for the vertical movement. The pawl $m^3$ engages with a toothed bar $n$ on the skeleton carriage N, which is slidingly mounted on the shafts $j^2$ $j^3$, secured on the carriage J, and which carries the wiper I. A detent $n'$ is mounted on the rock-shaft $j^3$ and engages the toothed bar $n$. It is thrown into engagement by a spring $n^2$, attached to a pin on the carriage J and to a crank-arm $n^3$ on the end of the shaft $j^3$. The detent is thrown out of engagement when the vertically-moving carriage is at its lowest position by the arm $n^3$ striking a pin $n^4$ in the plate H. The bar $n$ is also not in a position to be engaged by the pawl $m^3$ at this position of the carriage; but when the carriage has been raised one notch of the bar $j$ the pawl $m^3$ may engage the bar $n$, and the detent $n'$ is also released to engage the bar. It is readily seen that the vertical carriage being raised one notch and an intermittent current sent through the magnet M the carriage N will be carried across on the guides as many notches as there are pulsations, and the wiper I will be brought to a position below the horizontal line of contact-points $h'$ correspoding to such number.

Figure 13:
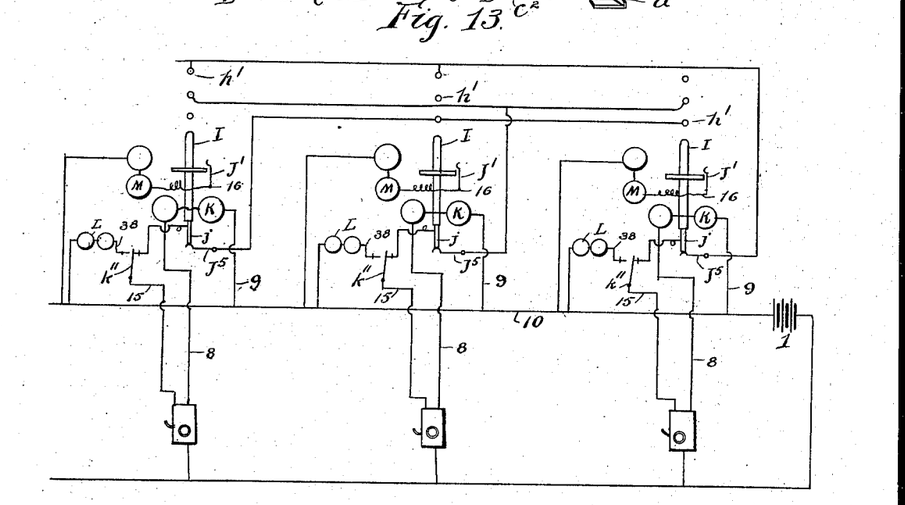
Fig. 13 is a diagrammatic view showing the normal circuits and release-magnet circuits of a set comprising three interconnected telephones and switches.

Fig. 13 is a view in diagram illustrating three central-station switchboards and their electrical connections and circuits embodying the principles of our invention, said switchboards corresponding, respectively, to three subscribers' stations.

The apparatus as illustrated is designed for making ninety-nine calls, though our invention is not to be limited in this respect.

Figure 12:
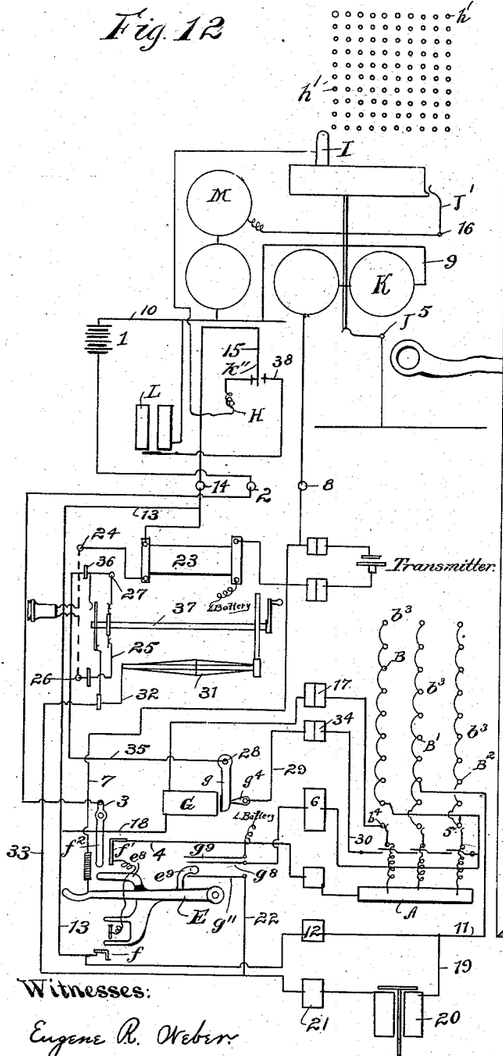
Fig. 12 is a view showing the system of connections and wiring.

The method of calling up a subscriber and the operation and circuit formed in doing so may be shown from the diagrammatic illustration in Fig. 12, which shows the signaling device represented as secured to the open door of the telephone-case, the hinges and hinged electrical connections being represented and designated by the numerals 6 12 21, &c. The first operation to be performed by the party calling up is to raise the buttons of his signaling device to the numbers representing the number of the telephone to be called—as, for instance, suppose the number to be called is "59" and the two right-hand columns in Fig. 1, representing units and tens or a total of ninety-nine, the right-hand or units button $d$ is raised to "9," the next button, representing tens, is raised to "5," and the left-hand button, which is associated with strip $B^2$, is raised past the single contact $b^3$. Then upon removing the receiver from the hook the buttons and wipers will fall, as before explained. As the first wiper to fall, which is the wiper associated with the left-hand button and strip $B^2$, touches the contact $b^3$ (shown) the following circuit is formed: beginning at battery 1 to binding-post 2 through wires 3 4 to front frame-plate A, serving as base of signaling device, through contacts 5 6 to hook E, wire 7, binding-post 8, magnet K, wire 9 to common-battery strip 10. This will have operated the magnet K and moved the carriage J up one notch to allow the cross-movement to operate. This is set in motion by the falling wiper $c'$, which makes and breaks the following circuit: Beginning as before, 1, 2, 3, 4, A, through contact-strip B', then connectors and binding-posts 11 12 13 14 15, through switch H, which is in electrical connection with the framework of the apparatus and which we have herein called "the mass," thence to the contact-carriage, thence to contact-finger J', point 16, magnet M back to battery. This current will operate as many times as the wiper $c'$ contacts with the points on the strip B' and through the magnet M will move the wiper I to a corresponding position beneath a row of the terminals $h'$. The falling of the last wiper $c$ in the signaling device repeats the first circuit described as many times as it passes over contact-points on the strip B, thereby again operating the magnet K and moving the wiper I up to a corresponding terminal $h'$; but as the wiper $c$ passes over the point $b^4$ the following circuit is formed: Beginning, as before, at battery 1 and following path 2, 3, 4, A, $b^4$, 17, magnet G, 18, 13, 14, 15, H, I, through wire $h'$, that it may be in contact with, to the switch of telephone called and having the corresponding number and in such switch through its base (which for convenience will be supposed to be numbered the same) and through connections of that telephone H and $J^5$, 15, 14, 13, 12, 19, 20, 21, 22, E, 7, 8, K, 9 back to common-battery strip 10. The coil 20 of the bell of the telephone called has sufficient resistance to prevent the magnet G in the calling phone from attracting its armature; but should the telephone called have its receiver down or be, in other words, "busy" the current will take the following circuit: 1, 2, 3, 4, A, $b^4$, 17, G, 18, 13, 14, 15, base H, $h'$, $J^5$ of called switch and through connections of said switch H, 15, 14, 23, 24, 26, 25, (the receiver being connected from 24 to 26,) 27, 28, 29, 30, 6, E, 7, 8, K, 9, 10. This being a circuit of lower resistance, magnet G will be energized, breaking the ringing or talking circuits hereinbefore traced between 28 and 29 at $g$ $g^4$. The ringing and talking circuits having been broken by the magnet G remain broken by reason of engagement of catch $g^2$ with armature $g$ until the receiver is replaced on the switch-hook, when arm $e^9$ depresses the catch $g^2$ and releases $g$. By this means the automatic switch of the subscriber called is not disturbed. The two phones being in connection, the ringing-circuit, whereby the bell of the party called is rung, is as follows: Beginning with armature 31 through connections 32, 33, 21, 20, 19, 12, 13, 14, 15, H, I, $h'$ to $J^5$ of called switch and in that switch through H, 15, 14, 13, 12, 19, 20, 21, 22, E, 7, 8, K, 9, 10 back through original switch 9, K, 8, 7, E, 6, 30, 34, 29, 28, 35, 36 to 37, which represents the mass of the generator and is in electrical connection with the armature 31. The party called having been rung up, the talking-circuit is formed as follows: Beginning at binding-post 14, 15, H, I, $h'$ to $J^5$ of called switch and in that switch through H, 15, 14, (called party has removed receiver,) 23, 24, receiver, 26, 25, 27, 36, 35, 28, 29, 34, 30, 6, E, 7, 8, K, 9, 10 to 9 of original switch, then through K, 8, 7, E, 6, 30, 34, 29, 28, 35, 36, 27, 25, 26, receiver, 24, 23 to 14 point of beginning. When the parties are through with the conversation, it becomes necessary to release the telephones and bring their mechanism to a normal position. The release-circuits are 1, 2, 3, E, 7, 8, K, 9, 10. This circuit is formed by placing the receiver on the hook. As the hook falls contact is made with the plate E' and through which with the contacts $f^2$. (See Fig. 4.) This is diagrammatically shown at 3, Fig. 12. Simultaneously the attraction of K closes another circuit as follows: 1, 2, 3, E, $f$, 13, 14, 15, $K^{11}$, $K^{12}$, 38, L, 10, L being the magnet on the back of the switch, releases the detent and allows the carriage to fall to its normal position, as above explained. When the switch-hook contact passes below $f$ after replacement of receiver, the magnet K is deënergized and the detent being released the carriage falls to normal position.

It is readily seen that throughout the devices and methods of connecting the circuits used in this invention various changes in details will readily suggest themselves as coming within the scope thereof, and we do not limit ourselves to the exact construction shown, but

What we claim, and desire to secure by Letters Patent, is—

1. In an automatic telephone system, a series of adjustable slides, a series of contact-points for each slide, mechanism for holding said slides in adjusted positions, a battery normally cut out of circuit, means for closing the battery-circuit and releasing said slides one after the other and restoring them to normal, making electric connection with the contact-points comprised within their adjustment, as they are thus restored, a switchboard with contact-points corresponding to the number of subscribers, a wiper to make contact with said points, electromagnets and their armatures operating step by step according to the pulsations transmitted from the slides, to feed said wiper over the points of the switchboard, and a releasing-magnet to restore the entire switchboard mechanism to normal.

2. In an automatic telephone system, a series of electromagnets with armatures actuating switch mechanism, a series of adjustable slides, with mechanism to retain said slides in adjusted position and out of electrical contact, a graduated board or table along which said slides are moved, keys and contacts whereby said slides in their return to normal are forced to cause a number of electrical pulsations corresponding to the number of the telephone called for, and mechanism whereby said telephone is put in circuit upon the completion of said pulsations.

3. In an automatic telephone system, a series of electromagnets with armatures actuating switch mechanism, a series of adjustable slides, a series of contact-points for each slide, a battery, means whereby the battery-circuit is retained open while said slides are being adjusted, means for holding said slides in adjusted position, and means whereby the battery is put in circuit and the slides released, one after the other, and returned to normal position, engaging the electrical contacts serially on the way and transmitting an electrical pulsation to said magnets for each contact.

4. In an automatic telephone system, a series of adjustable slides, a series of contact-points past which said slides are adjusted, mechanism for holding said slides in adjusted position out of electrical contact with the adjacent contact-point last passed, a battery, a circuit therefor including said contact-points, said circuit being normally broken, means for causing said slides to be restored one after the other to normal, wipers on said slides which make and break the battery-circuit as they pass said contact-points, a switchboard with contacts corresponding in number to the subscribers served by the system, a wiper to close circuit with said latter contacts, electromagnets and armatures to feed said last-named wiper over the switchboard step by step with the pulsations induced by the closing and opening of the battery-circuit as the slides return to normal, and a releasing-magnet for restoring the switchboard mechanism to normal position.

5. In an automatic telephone system, the combination of a series of toothed bars swinging on longitudinal pivots, a series of contact-points, arranged in conjunction with said bars, a series of slides carrying wipers and adapted to be adjusted to any definite point along said bars and retained thereby, a source of electric energy, means whereby the circuit of said source is closed with the series of the contact-points, means for releasing said slides and causing them to return to zero with their wipers making and breaking circuit with said contact-points in such return, switching mechanism included in the circuit, actuated step by step for each electric pulsation induced by such make and break, and releasing mechanism whereby all parts of said switching mechanism are returned to normal when the talking-circuit is to be broken.

6. In an automatic telephone system, the combination of a series of toothed bars swinging on longitudinal axes, a series of contact-points, arranged in conjunction with said bars, a series of slides provided with wipers to make connection with said contact-points and temporarily locked in adjusted position by said toothed bars, a switch-hook normally depressed by the weight of the receiver, a cam on one of the said toothed bars, an arm on the switch-hook acting on said cam as the hook is released by the removal of the receiver to swing said bar out of engagement with its corresponding slide, cams on the remaining bars, arms or projections on each slide acting on the cam of the next adjacent bar as said slide approaches zero to disengage it from its appurtenant slide, a battery-circuit closed by the switch-hook as it rises and including the aforementioned contact-points and a switchboard mechanism included in the circuits of said contacts and operating automatically under the influence of electric pulsations traversing such circuits caused by said wipers operating over said contacts.

7. The combination with the switch-hook, of the electromagnet G, its armature, the catch for said armature, a finger carried by an arm of said switch-hook and operating to release the catch, and insulating material interposed between said finger and catch, and an electrical circuit arranged to be closed by the armature of said magnet when said armature is released.

8. The combination of the switch-hook, the electromagnet G, its armature, the catch for said armature, the upper contact-springs $g^8$, $g^9$, the lower contact-spring $g^{11}$, the insulated pin $g^{10}$, between them, the finger on the switch-hook arranged adjacent to said armature-catch and to extend above the same and operating to lift the upper contact-springs as the hook rises and depress the lower contact-spring and release the catch as the hook falls, and insulating material between the said finger and catch.

9. In an automatic telephone system, the combination with the switching mechanism at each station, of an electromagnet adapted to be operated by the same electrical current that operates the telephone system, and normally lying in a shunt-circuit therefrom, and electrical circuits operating as a test to determine whether the station called is busy, and a cut-out operated by said magnet whereby said station is put out of communication with the calling-station if it is busy.

10. In an automatic telephone system, a calling mechanism including a series of movable contacts adapted to be set to a position corresponding to the number of any particular subscriber in the system, means for holding said contacts in adjusted position, a coöperating series of contact-points for each movable contact, a main battery, a circuit therefor, said circuit being normally broken, means for closing said battery-circuit, said means operating coincidently to release one of said movable contacts from adjusted position to permit the return of same, means actuated by the return of said movable contact for releasing the next succeeding movable contact, in combination with circuit-completing devices, electromagnets for operating the same, the circuits of said magnets including said series of contact-points, and a releasing-magnet for restoring the said circuit-completing apparatus to initial position, as and for the purpose set forth.

11. In an automatic telephone system, a calling mechanism for each subscriber's station including a series of movable contacts arranged to be displaced to positions corresponding to the various subscribers to the system, means for sustaining said contacts in displaced position, means normally operating to return said contacts to initial position, a series of coöperating contact-points for each of said contacts whereby upon the return of each contact to initial position it successively makes and breaks the circuit of said contact-points, a receiver-hook, a main battery, a circuit therefor, said circuit being normally broken, a contact device actuated by the movement of said hook when the receiver is removed therefrom for closing the contacts included in said battery-circuit, means also actuated by the movement of said hook for releasing one of said contacts, means actuated by the return of each of said contacts to initial position for releasing the next succeeding contact, electrical devices for completing circuit connections between the subscribers' lines and the lines of other subscribers to the system, the circuits of said electrical devices including said contact-points; all combined and arranged as and for the purpose set forth.

12. In an automatic telephone system, a calling mechanism including a series of movable contacts, a series of coöperating contact-points for each of said series of contacts, means normally operating to maintain said contacts in initial or retracted position, means for supporting said contacts in displaced position, a receiver-hook, a main battery, a circuit therefor, said circuit including said contact-points, electrical devices arranged in said circuit for completing connection with the line of any other subscriber to the system, means operated by the movement of said hook when the receiver is removed therefrom for completing said battery-circuit and for releasing one of said contacts, and means actuated by the return of each of said contacts to initial position for releasing the next succeeding contact, as and for the purpose set forth.

13. In an automatic telephone system, the combination with a series of movable contacts, a coöperating series of contact-points for each of said series of contacts, supporting devices for said contacts whereby said contacts are sustained in displaced position, a receiver-hook, means carried thereby for engaging the support for one of said contacts to shift the same out of supporting relation with respect to said contact, whereby said contact is permitted to return to initial position, and an extension associated with each of said contacts and operating to displace the support of each succeeding contact, a circuit for said series of contact-points, and electrical devices arranged in said circuit for completing connection with the line-wire of any other subscriber to the system, as and for the purpose set forth.

JOHN K. NORSTROM.
JOHN J. BROWNRIGG.

Witnesses:
EUGENE R. WEBER,
JULES C. HERTZOG.